(12) United States Patent
Fielek

(10) Patent No.: US 7,994,648 B1
(45) Date of Patent: Aug. 9, 2011

(54) MECHANICAL CONTINUOUS SUPPLY OF ELECTRICAL CURRENT FROM THE MOTION OF SUSPENSION COMPONENTS

(76) Inventor: Barry Louis Fielek, South Lyon, MI (US)

( * ) Notice: Subject to any disclaimer, the term of this patent is extended or adjusted under 35 U.S.C. 154(b) by 80 days.

(21) Appl. No.: 12/798,805

(22) Filed: Apr. 12, 2010

(51) Int. Cl.
*F02B 63/04* (2006.01)

(52) U.S. Cl. ........................................ 290/1 R

(58) Field of Classification Search .............. 290/1 R; 180/165, 65.22, 65.31, 65.265
See application file for complete search history.

(56) References Cited

U.S. PATENT DOCUMENTS

| | | | |
|---|---|---|---|
| 3,507,580 A * | 4/1970 | Howard et al. | 417/231 |
| 4,387,781 A * | 6/1983 | Ezell et al. | 180/65.22 |
| 4,500,827 A * | 2/1985 | Merritt et al. | 322/3 |
| 5,091,679 A * | 2/1992 | Murty et al. | 318/153 |
| 5,337,560 A | 8/1994 | Abdelmalek | |
| 5,590,734 A * | 1/1997 | Caires | 180/165 |
| 6,361,664 B1 | 3/2002 | Faber et al. | |
| 6,809,426 B2 * | 10/2004 | Naar et al. | 290/1 R |
| 6,841,970 B2 | 1/2005 | Zabramny | |
| 6,952,060 B2 | 10/2005 | Goldner | |
| 7,161,254 B1 * | 1/2007 | Janky et al. | 290/1 R |
| 7,261,171 B2 * | 8/2007 | de la Torre et al. | 180/65.31 |
| 2006/0237968 A1 * | 10/2006 | Chandrasekaran | 290/1 R |
| 2010/0006362 A1 * | 1/2010 | Armstrong | 180/165 |

* cited by examiner

*Primary Examiner* — Julio Gonzalez

(57) ABSTRACT

One embodiment attached to a vehicle suspension strut or vehicle suspension shock-spring assembly or a vehicle shock absorber includes a set of cylinders (64,66,68,70) containing a number of magnets (72,74,76,78,80,82,84,86,88) and a second set of cylinders (42,44,46,48,50) containing a number of electrically conducting coils (54,56,58,60,62). The set of cylinders containing the magnets is attached to one end of the suspension strut or shock-spring or shock absorber assembly and the set of cylinders containing the conducting coils is attached to the opposite end of the suspension strut or shock-spring or shock absorber assembly such that the magnets move past the conducting coils when the suspension assembly is compressed or extended during displacement of the vehicle wheel. The conducting coils are connected to an electrical charging system used to store electrical charge or generate electrical power.

8 Claims, 6 Drawing Sheets

Rear Strut and Swaybar Assembly

Section A-A

MECHANICAL CONTINUOUS SUPPLY OF ELECTRICAL CURRENT FROM THE MOTION OF SUSPENSION COMPONENTS

BACKGROUND

Prior Art

The following is a tabulation of some prior art that presently appears relevant to the generation of electrical current from the motion of suspension components:

U.S. Patents

| Patent Number | Kind Code | Issue Date | Patentee |
| --- | --- | --- | --- |
| 6,952,060 | B2 | Oct. 4, 2005 | Goldner |
| 6,841,970 | B2 | Jan. 11, 2005 | Zabramny |
| 6,361,664 | B1 | Mar. 3, 2002 | Faber et al. |
| 5,337,560 | | Aug. 8, 1994 | Abdelmalek |

There is a push to produce more efficient motor vehicles which use less or no carbon dioxide producing energy sources. This has led to hybrid electric and fully electric vehicles. These vehicles require electrical storage systems, such as batteries, used to power electric motors. The vehicles may obtain their electrical energy from plug in electrical sources and/or the energy normally lost during braking of the vehicle or from internal combustion engines turning electric generating devices. Of these methods for obtaining electrical energy the braking system obtains electrical energy from the mechanical rotational energy of the vehicle wheel. This energy is normally lost as heat which is produced from the friction resulting from the motion of the wheel rotors against the brake pads.

Additional means of producing electrical current from the motion of suspension components have been proposed. For example, U.S. Pat. No. 5,337,560 (1994) to Abdelmalek discloses a shock absorber system that has pressure discharge lines attached to the individual shock absorbers and a gas expander generator composed of magnets and conducting coils which move past each other to produce an electrical current for electrical power. This system requires the installation of the special shock absorbers, discharge lines between the shock absorbers and the gas expander generators, and the gas expander generator.

This system has the expense of manufacturing a unique special shock absorber, pressure discharge lines and a unique special apparatus (gas expander generator for generating the electric current). The shock absorber must also be made to have the desired shock characteristics of the vehicle it is to be used on. This requires the complexity of the system manufacturer interacting with the vehicle manufacturer in order to obtain the characteristics. In addition, the installation of the system requires determining the appropriate location for the pressure lines and generator on the vehicle which may differ from vehicle type to vehicle type, adding additional complexity and expense to the installation. The system also adds additional weight to the vehicle. Finally, it would require replacement of the shock absorbers, if the system is to be installed on a current assembled vehicle, adding additional installation cost.

U.S. Pat. No. 6,841,970 (2005) to Zabramny discloses a cylindrical magnet attached to the vehicle body which is free to move through a coil of wire which is attached to a suspension component. The relative motion between the suspension and the vehicle body moves the coil relative to the magnet producing an electrical current in the coil. The design produces small amounts of current which can be applied to charge the battery or operate electrical devices requiring small amounts of power. By varying the amount of current allowed to flow through the electrically conducting coils the opposing force between the coils and magnets can be varied, thus providing for more or less additional damping to the suspension. This system requires determining an appropriate location for installation which may vary for different makes of vehicles. Furthermore, this system produces very small amounts of current from the motion of any suspension component it may be attached to.

U.S. Pat. No. 6,952,060 (2005) to Goldner discloses an electromagnetic shock absorber composed of an array of stacked magnets which move relative to inner concentric electrically conducting coil windings positioned adjacent to the magnets. The motion of the magnets relative to the coil windings produces an electrical current in the windings which produces a magnetic field around the windings of opposite polarity to the magnetic field of the magnets. The magnetic field of opposite polarity applies a force against the motion of the magnets and hence against the motion of any suspension component attached to the electromagnetic shock absorber. The strength of the shock absorber depends on the strength of the magnets, the number of magnets and the number of electrically conducting windings. The electric current is further used to charge a battery or power electrical systems. This system has the expense of manufacturing a unique special shock absorber. The shock absorber components must be specifically designed to give the required damping required for the vehicle it is to be used on. This requires the complexity of the system manufacturer interacting with the vehicle manufacturer in order to obtain the required damping characteristics for the vehicle it is to be installed on and will differ from vehicle make to vehicle make. This shock absorber will be heavier than the conventional shock absorber. Finally, it would require replacement of the shock absorber if the system is to be installed on a currently assembled vehicle, adding additional installation cost.

U.S. Pat. No. 6,361,664 (2002) to Fader et al. discloses a magnetic member attached to one end of a shock absorber which moves within an electrical coil attached to the other end of the shock absorber to produce a very low voltage across the coil. The low voltage is applied to a system for storing electrical charge. The electrical charge is then applied to the shock absorber metal components for preventing corrosion of the metal components. The apparatus produces very low electrical currents and charge per wheel motion. The purpose of the apparatus is to provide enough electrical charge to the metal components to prevent corrosion of the component. The prevention of corrosion to the metal components requires very little electrical charge.

SUMMARY

In accordance with one embodiment of the apparatus, a set of magnets is attached to one end of a vehicle suspension strut or shock-spring or shock absorber assembly which move relative to a set of electrically conducting coils attached to the other end of the vehicle suspension strut or shock-spring or shock absorber assembly in order to produce an electrical current in the coils when the magnets and coils move relative to each other. This results in an endless supply of electrical power to propel the vehicle at a speed comparable to that of vehicles today.

ADVANTAGES

Furthermore, the embodiment is attached to vehicles as manufactured today requiring no special parts. The assembly of magnets and electrically conducting coils are designed to be attached to any prior art vehicle suspension strut or shock-spring or shock absorber assembly. The apparatus adds very little additional weight to the vehicle. The force opposing the motion of the suspension produced by the induced magnetic field in the electrically conducting coils adds a small amount of additional damping to the suspension which helps in reducing unwanted vibrations into the vehicle. It produces significant electrical current at vehicle speeds typically driven on a given road surface e.g. slow speeds on gravel or bumpy roads and high speeds on freeways. The electrical current produced is sufficient to power equipment or charge batteries during short driving trips. Finally, the apparatus is less costly to produce.

| Drawings - Reference Numerals | |
|---|---|
| 40 | embodiment general designation |
| 42 | shock absorber to conducting coils attachment cylinder |
| 44 | shock absorber to conducting coils attachment cylinder |
| 46 | shock absorber to conducting coils attachment cylinder |
| 48 | shock absorber to conducting coils attachment cylinder |
| 50 | shock absorber to conducting coils attachment cylinder |
| 52 | top shock absorber mounting plate |
| 54 | ring of conducting coils |
| 56 | ring of conducting coils |
| 58 | ring of conducting coils |
| 60 | ring of conducting coils |
| 62 | ring of conducting coils |
| 64 | shock absorber to magnets attachment cylinders |
| 66 | shock absorber to magnets attachment cylinders |
| 68 | shock absorber to magnets attachment cylinders |
| 70 | shock absorber to magnets attachment cylinders |
| 72 | magnet |
| 74 | magnet |
| 76 | magnet |
| 78 | magnet |
| 80 | magnet |
| 82 | magnet |
| 84 | magnet |
| 86 | magnet |
| 88 | magnet |
| 90 | bottom shock absorber mounting plate |
| 92 | shock absorber piston rod |
| 94 | dust cover |
| 96 | shock absorber |
| 98 | jounce (spring) bumper |
| 100 | coil spring |

DETAILED DESCRIPTION

Figure 4:
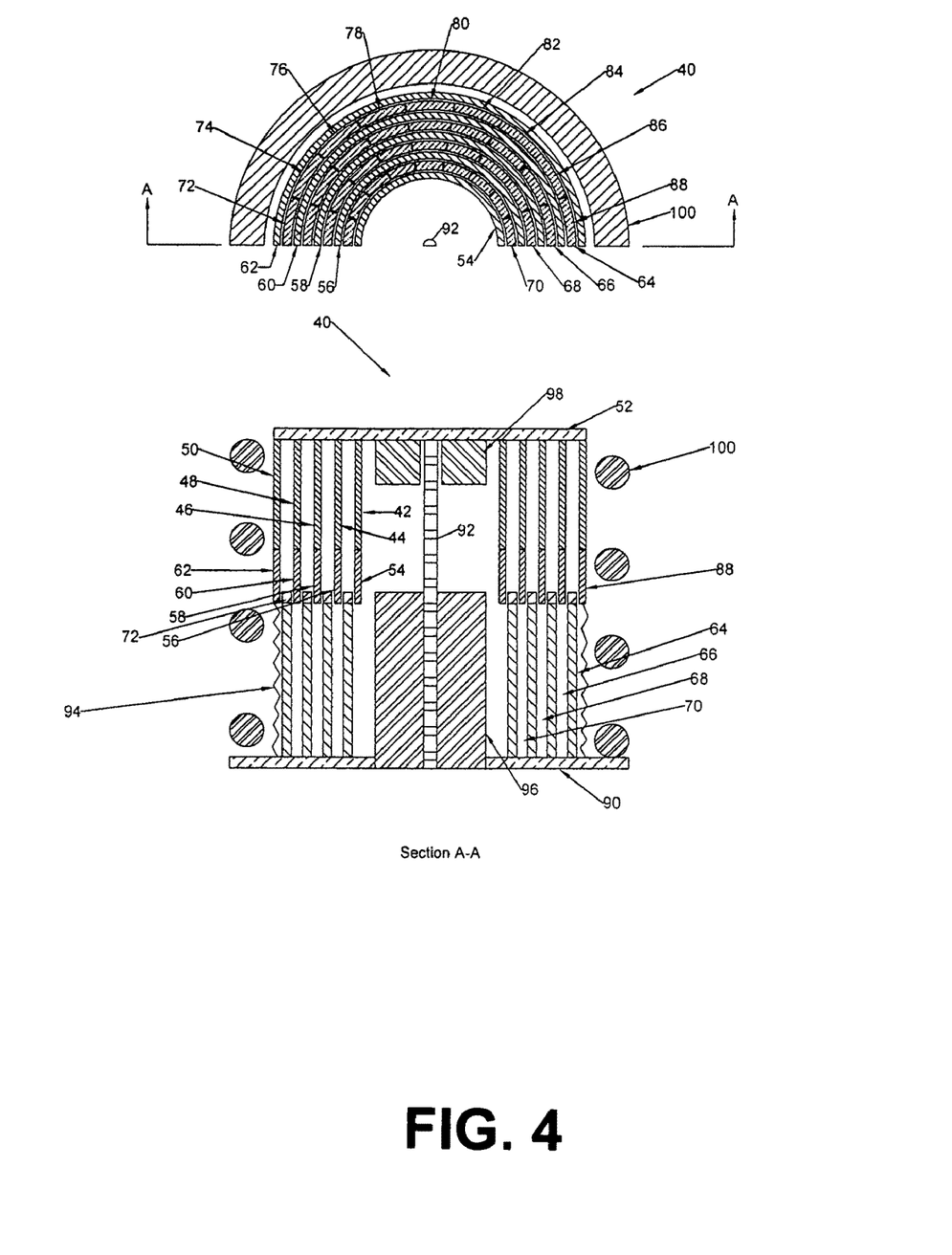
FIG. 4 is a longitudinal central section view of one preferred embodiment of the suspension electric current generating assembly and a top section view passing through the magnets and conducting coils of the longitudinal central section view in accordance with one embodiment for a strut assembly.

FIG. 4—First Embodiment

FIG. 4 illustrates a cross sectional view through the length of one embodiment of the apparatus generally designated by numeral 40 and a top view of the cross section. The embodiment consists of five cylinders 42, 44, 46, 48, 50 of non-magnetic and electrically non-conducting material. The five cylinders are attached to the top shock absorber mounting plate 52. Attached to each of the five cylinders is a number of rings 54, 56, 58, 60, 62 consisting of a number of coils of conducting wire. Each ring of conducting coils is attached to an electrical circuit (not shown) used to store electrical charge or to power electrical systems. Such electrical circuitry is well known in the field of electronics circuit art and to those having ordinary skill in the field of electronics art and will be described only by their function. Between each adjacent set of cylinders containing the conducting rings of wire is a cylinder of non-magnetic and electrically non-conducting material with a number of individual magnets attached to it. There are four such cylinders 64, 66, 68, 70 attached to the bottom shock absorber mounting plate 90. In this embodiment there are eighteen magnets attached to each cylinder, (only nine 72, 74, 76, 78, 80, 82, 84, 86, 88 are shown in FIG. 4). The magnets are oriented such that the same magnetic pole points radially outward from the center of the piston rod 92 (e.g. the N poles) and the same magnetic pole points radially inward toward the center of the piston rod 92 (e.g. the S poles). Attached to the outer most cylinder of the embodiment is a corrugated boot or dust cover 94. FIG. 4 also shows the portion of the strut shock tube 96 above the strut spring seat plate 90, the strut shock piston rod 92 which is attached to a typical prior art body mount on the vehicle body (not shown) and a jounce bumper 98 normally attached to a typical prior art body mount (not shown). Also shown in FIG. 4 is the coil spring 100 in the strut assembly.

Operation

Figure 5:
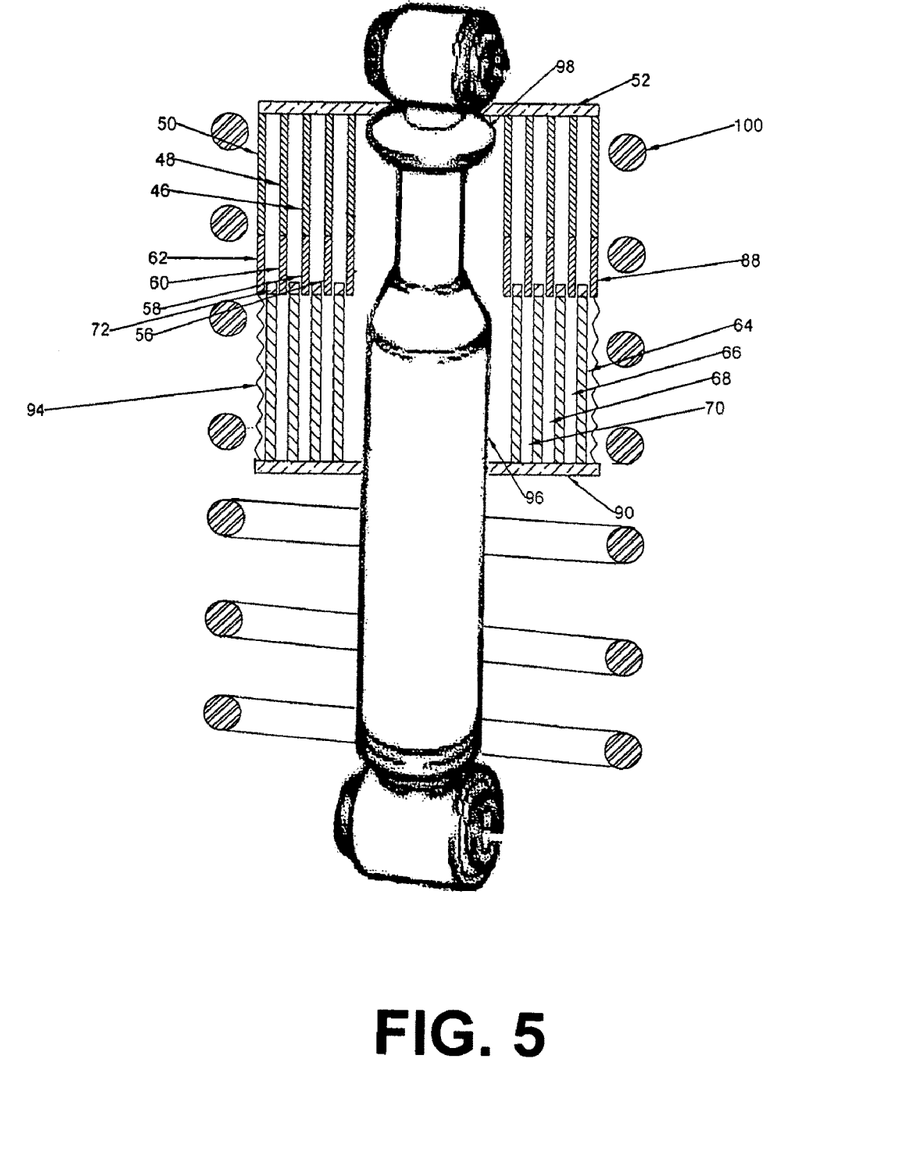
FIG. 5 is a longitudinal central section view of an alternate embodiment of the suspension electric current generating assembly in accordance with the embodiment for a shock-spring assembly.
Figure 6:
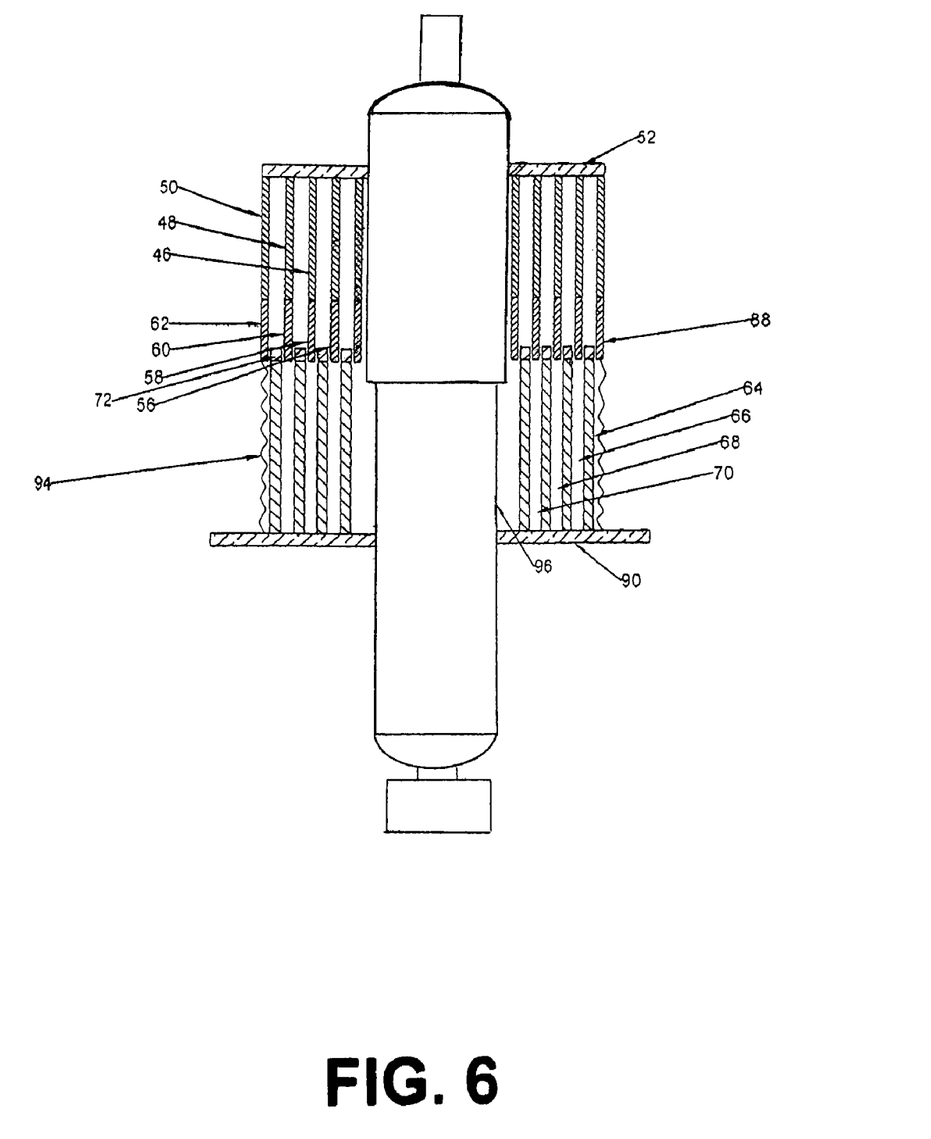
FIG. 6 is a longitudinal central section view of a second alternate embodiment suspension electric current generating assembly in accordance with the embodiment for a shock absorber.

The number of coils in a ring is chosen to have the maximum allowable resistance for the charging circuit. The resistance, inductance and the capacitance of the electrical circuit determines the amount of charge produced for a wheel impact. The total resistance of a ring depends on the gage of the conducting wire making up the coils and the number of coils in the ring. The thickness and height of a ring depends on the diameter of the conducting wire and the number of coils required to produce the maximum allowable resistance. The total number of rings attached to a cylinder depends on the height of the magnets and the strength of the magnetic field as a function of distance from the surface of magnet. The charge produced for storage or electric power generation during the impact of a wheel depends on the voltage produced in the coils, the capacitance of the charging circuit, the duration of time the impact of the wheel lasts, and the amount of time it takes for the voltage across the capacitor circuit to equal the voltage produced in the coils. The voltage produced in a ring depends on the relative velocity between the magnets and the conducting coils, the length of the coils in the magnetic field of the magnet, the strength of the magnetic field seen by the coil and the number of coils in the magnetic field. The relative velocity depends on the acceleration and duration of time of the wheel impact. The time it takes for the voltage produced in the coils to be built up in the capacitor circuit (the charging time) depends on the resistance, inductance and capacitance of the circuit. The resistance, inductance and capacitance are chosen to make the charging time as close to the impact duration time as possible, while at the same time maximizing the capacitance of the charging circuit. The closer these times are together, the fewer impacts are required to fully build up the voltage across the charging circuit. The resistance in the circuit is primarily due to the resistance of the conducting ring and any rectifying circuit. The rectifying circuit is used to prevent discharging of the capacitor circuit, back through the conducting ring after completion of a wheel impact and to apply the same voltage polarity to the charging circuit regardless of the direction of the wheel velocity. FIGS. 5 and 6 are not to scale for a typical shock-spring and shock system and are for illustration only and not as limitation of the embodiment. The exact geometry and dimensions of any embodiment depend on the dimensions of the strut or shock absorber it is attached to, and the manufacturing, assembly, material, and cost constraints. The one embodiment illustrated for a strut system in FIG. 4 is estimated to produce 13 coulombs of charge per wheel impact with a one inch bump at a vehicle speed of 4 mph. It is estimated that the embodiment will produce similar amounts of charge due to highway pavement impacts at highway vehicle speeds.

Additional Embodiment

Figure 1:
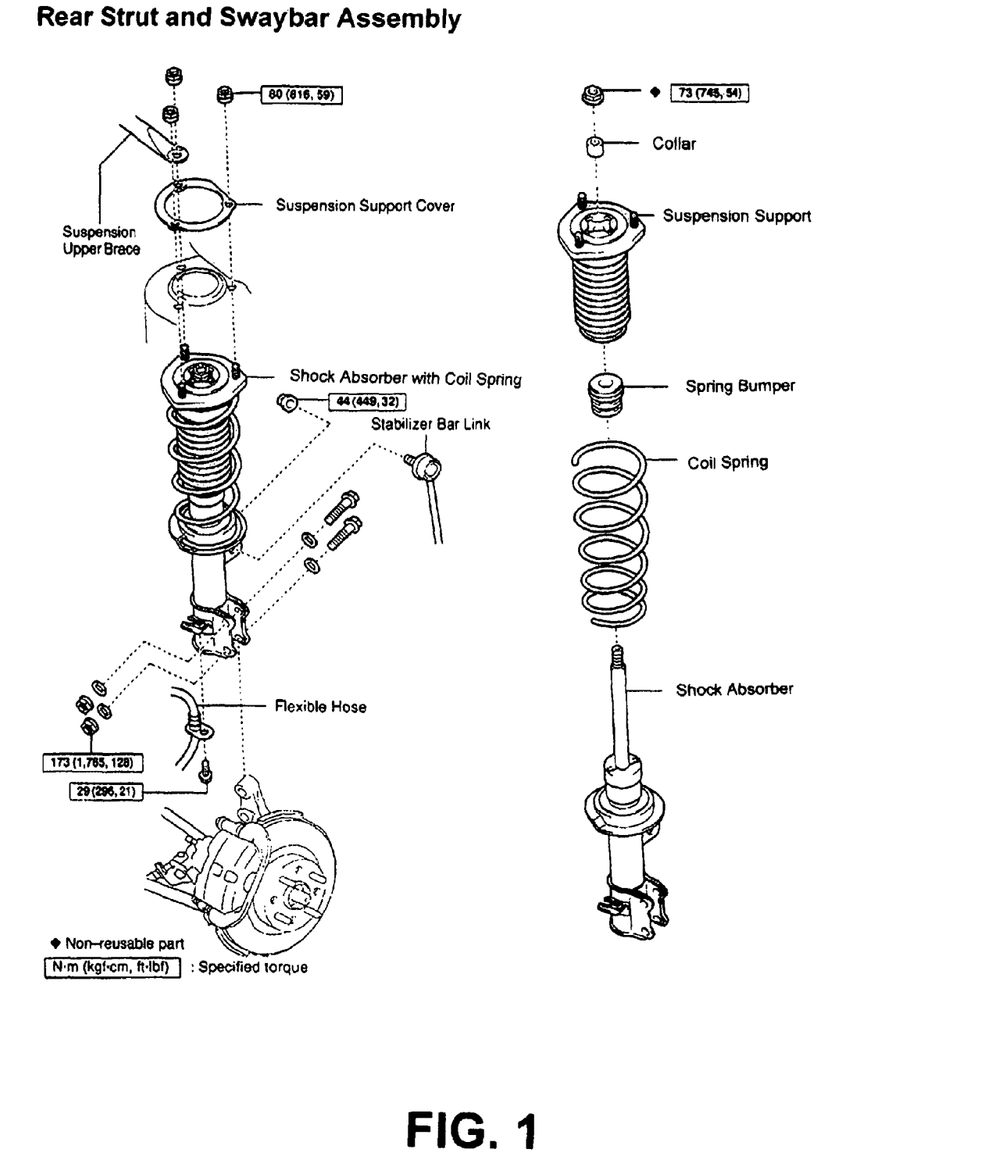
FIG. 1 is an isometric view of a typical prior art vehicle suspension strut assembly along with a view of the components making up the suspension strut.
Figure 2:
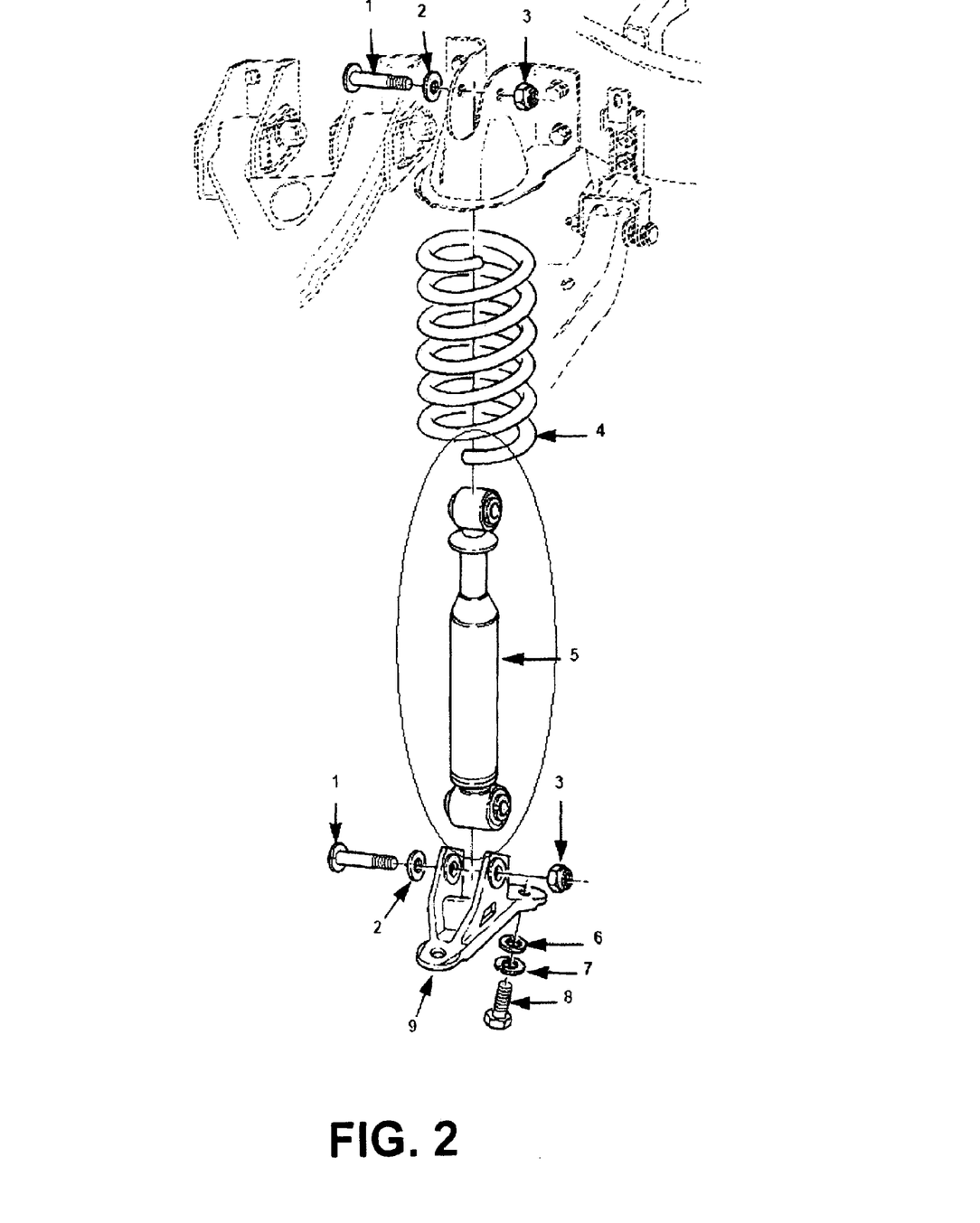
FIG. 2 is an isometric view of a typical prior art vehicle shock-spring assembly.
Figure 3:
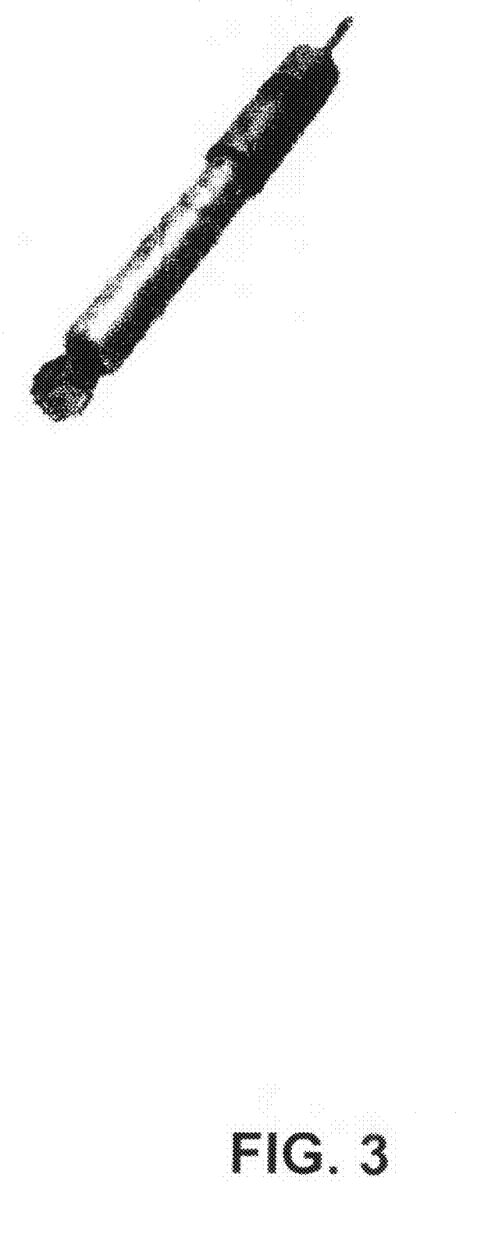
FIG. 3 is an isometric view of a typical prior art vehicle shock absorber.

For clarity, FIG. 1 illustrates a prior art commercial strut assembly, FIG. 2 illustrates a prior art commercial shock absorber assembly and FIG. 3 illustrates a prior art commercial shock absorber used for a leaf spring suspension. A second embodiment of the apparatus would have a set of cylinders containing a set of conducting coils between the coil spring 100 and shock absorber 96 attached to the top mounting plate 52 in FIG. 5. The set of cylinders containing a set of magnets between the conducting coils would be attached to the bottom of the shock absorber 96. The detail geometry and dimensions of the second embodiment will depend on the particular shock absorber application.

Alternative Embodiment

A third embodiment would have the set of conducting cylinders attached to the top of the shock absorber 96 and the set of cylinders between the conducting cylinders with the magnets attached to the bottom of the shock absorber 96.

It is to be understood that the present embodiment is not limited to the embodiments described above, but encompasses any and all embodiments within the scope of the following claims.

Advantages

The embodiments fulfill the much and urgent need for an apparatus which converts any mechanical energy produced by the motion of the vehicle wheel (which is normally lost) to electric current for use in electric, hybrid and conventional vehicles.

The embodiments provide a new and useful additional way of obtaining electrical energy from normally unused mechanical energy, by taking the unused kinetic energy produced by the vertical motion of a vehicle wheel as the vehicle transverses along a terrain and converts it into useful electric current to be eventually used to power electrical systems in the vehicle (e.g. an electric motor).

The embodiment consists of a new and novel way of combining the use of the motion of a prior art shock absorber attached to the suspension of a vehicle with the well known principle that the motion of a magnet through an electrically conducting coil produces an electric current.

The embodiment consists of a unique arrangement of electrically conducting coils and magnets, not contemplated before to produce electrical current from the extension and compression motion of a shock absorber due to the motion of a vehicle wheel as the vehicle transverses the terrain.

By utilizing a new, novel and unique geometry of cylinders for attaching the coils and magnets to the shock absorber, the number of coils and magnets attached to the suspension shock absorber can be maximized to obtain large amounts of current from each vertical displacement of the vehicle wheel.

By having a number of rings (not contemplated before) of electrically conducting coils attached to a given cylinder, the electrical resistance is minimized producing significantly more charge from the embodiment.

By enabling the coils and magnets to be attached to any prior art shock absorber a unique suspension shock absorber does not need to be installed on a vehicle thus eliminating the need and additional cost for a special suspension shock absorber to be designed and installed on the vehicle.

The new unique and non-contemplated placement of magnets around several adjacent cylinders with the magnetic poles in the adjacent cylinders oriented to attract each other provides several new advantages:

(a) By having the electrically conducting coils pass between two magnets whose magnetic poles are oriented opposite to each other, the magnetic flux is doubled and produces twice the voltage across the coils.

(b) By having a magnet in a cylinder between two other cylinders each with its magnet's pole opposite to the magnetic poles of the in between magnet, the total attractive force on the in between magnet is approximately balanced out or zero. Hence, the attractive force on the inner cylinder of magnets is approximately zero. Only the outer and inner most cylinder of magnets will have unbalanced forces pulling on them.

(c) The circular placement of the magnets requires the magnets to have a partial wedge shape in order to fit around the cylinder. This wedge shape prevents the outer most cylinder of magnets from collapsing inward by using the same principle which keep arches of stones from collapsing. The magnets in the inner most cylinder are held in place by the addition of a cylinder around the outer surface of the inner most magnets.

CONCLUSION, RAMIFICATIONS, AND SCOPE

Accordingly, the reader will see that the never before contemplated geometry of the electrically conducting coils and magnets of the various embodiments of the electric current producing apparatus provides for the installation to prior art shock absorber systems. In addition, the new and unique arrangement of the electrically conducting coils and magnets produces large significant amounts of current from the vehicle motion at slow speeds over rough roads, at typical speeds over coarse roads, and at highway speeds on expressways. Furthermore, the production of large significant electrical current from the motion of the vehicle has the additional advantages in that:

- it provides for the much urgent need for an additional means of charging a vehicle battery or powering vehicle electrical systems while the vehicle is operating; and
- it provides for the much urgent and desirable reduction in the use of fossil fuels for charging electric, hybrid, and conventional vehicle batteries.

Although the description above contains many specificities, these should not be construed as limiting the scope of the embodiments but as merely providing illustrations of some of several embodiments. For example, although the embodiments are illustrated for a passenger type of vehicle suspension shock system, the embodiments can be applied to military, construction, agriculture, etc. vehicles.

I claim:

1. An apparatus that can be attached around and in between the coil spring and shock absorber of any vehicle suspension strut, spring shock system or packaged around any vehicle suspension shock absorber system for the purpose of producing a large continuous supply of electrical current from the compression or extension of any vehicle suspension strut, spring shock or shock absorber system for the purpose of charging an electrical storage unit or to power electrical equipment comprising:
   - a set of concentric cylinders fitted around the shock absorber portion of any vehicle suspension strut, spring shock or shock absorber and in between the coil spring and shock absorber of any vehicle suspension strut or spring shock absorber system and attached to one end of any vehicle suspension strut, spring shock or shock absorber system;
   - a second set of concentric cylinders fitted in between the concentric cylinders of the first set and around the shock absorber portion of any vehicle suspension strut, spring shock or shock absorber and in between the coil spring and shock absorber of any vehicle suspension strut or spring shock absorber system and attached to the other end of any vehicle suspension strut, spring shock or shock absorber system such that the second set of cylinders is free to move relative to the first set when the strut, spring or shock absorber system is compressed or extended due to the motion of the vehicle wheel as the vehicle moves;

wherein a set of concentric cylinders attached at one end of the strut, spring shock or shock absorber system further comprises,
   individual cylinders of non magnetic material containing magnets closely spaced, with a minimum space between adjacent magnets, attached at the cylinder end not attached to the strut, spring shock or shock absorber end and around the circumference of the cylinder.

2. The apparatus of claim 1 further comprising:
a second set of concentric cylinders attached to the other end of the strut, spring shock or shock absorber system comprising:
individual cylinders of electrical non conducting material containing several rings of electrical conducting coils attached around the cylinder and at the cylinder end not attached to the strut, spring shock or shock absorber system.

3. The apparatus of claim 1 further comprising:
individual magnets with a minimum of separation between them and separated from each other by non magnetic material and located at the same height as the rings of electrical conducting coils when the vehicle is stationary.

4. The apparatus of claim 3 comprising:
individual wedge shaped magnets comprising:
   - a convex surface separated from a concave surface and having a wedge shape cross section with one radius of the cross section equal to the radius of the convex surface and the other radius of the cross section equal to the radius of the concave surface.

5. The apparatus of claim 2 further comprising:
a set of rings of electrical conducting coils comprising:
individual coils of electrical conducting material wound around each non electrical conducting cylinder.

6. The apparatus of claim 5 further comprising:
individual coils comprising:
electrical conducting material whose gage and length are chosen to maximize the electrical current produced by the displacement of coils past the magnets.

7. The apparatus of claim 6 further comprising:
electrical connectors attached to each end of the electrical conducting coils use to connect the electrical conducting coils to an electrical system used to charge an electrical storage unit or provide electrical power to run electrical systems.

8. The apparatus of claim 6 further comprising:
an electrical system used to charge an electrical storage unit or provide electrical power to run electrical systems comprising:
the appropriate electrical equipment well known to those in the field to take the electric current produced by the apparatus and use it to charge an electrical storage unit or provide electrical power to run electrical systems.

* * * * *